United States Patent
Hwang et al.

(10) Patent No.: US 7,217,748 B2
(45) Date of Patent: May 15, 2007

(54) POLYMER-CHAIN-GRAFTED CARBON NANOCAPSULE

(75) Inventors: Gan-Lin Hwang, Tainan (TW); Abraham Joseph K, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 355 days.

(21) Appl. No.: 10/740,403

(22) Filed: Dec. 22, 2003

(65) Prior Publication Data

US 2004/0238799 A1    Dec. 2, 2004

(30) Foreign Application Priority Data

Dec. 26, 2002   (TW) ............................... 91137442 A

(51) Int. Cl.
*C08J 9/32* (2006.01)

(52) U.S. Cl. .................. 523/218; 523/215; 524/495; 524/496

(58) Field of Classification Search .............. 523/215, 523/218; 524/495, 496
See application file for complete search history.

(56) References Cited

U.S. PATENT DOCUMENTS

| 6,872,236 B1 | 3/2005 | Hwang |
| 2003/0159917 A1 | 8/2003 | Hwang |
| 2006/0252853 A1* | 11/2006 | Ajayan et al. .............. 523/215 |

* cited by examiner

*Primary Examiner*—Edward J. Cain
(74) *Attorney, Agent, or Firm*—Sughrue Mion, PLLC

(57) ABSTRACT

A polymer-chain-grafted carbon nanocapsule. The polymer-chain-grafted carbon nanocapsule includes a carbon nanocapsule and at least one kind of polymer chain grafted thereon, forming a polymer-chain-grafted carbon nanocapsule in which the carbon nanocapsule is the core thereof. The polymer-chain-grafted carbon nanocapsules have the following formula: F(-P)m, in which F is the carbon nanocapsule, P is the polymer chain, and m is the number of the polymer chain. By grafting high-purity carbon nanocapsules with polymer chains, the application thereof is expanded.

11 Claims, 1 Drawing Sheet

POLYMER-CHAIN-GRAFTED CARBON NANOCAPSULE

BACKGROUND OF THE INVENTION

1. Field of the Invention

The present invention relates to carbon nanocapsules, and more particularly to polymer-chain-grafted carbon nanocapsules.

2. Description of the Related Art

A carbon nanocapsule is a polyhedral carbon cluster constituted by multiple graphite layers having a balls-within-a ball structure. The diameter of a carbon nanocapsule is about 3–100 nm. There are two types of carbon nanocapsules: hollow and metal-filled. The center of a hollow carbon nanocapsule is, of course, hollow, while that of a metal-filled nanocapsule is filled with metals, metal oxides, metal carbides, or alloys.

Carbon nanocapsules were first discovered with carbon nanotubes in 1991, in the process of producing carbon nanotubes. Owing to the strong van der Waals force between carbon nanocapsules and carbon nanotubes, it is not easy to isolate carbon nanocapsules from the carbon nanotubes. In addition, the amount of carbon nanocapsules produced with carbon nanotubes is sufficient only for structural observation under an electron microscope, thus the application thereof is limited.

With continuous research, processes producing high-purity hollow carbon nanocapsules as well as magnetic metal-filled carbon nanocapsules have been developed. (Please refer to U.S. patent application Ser. No. 10/255,669 and Ser. No. 10/329,333) With their special fullerene structure and optoelectronic properties, carbon nanocapsules are suitable for use in various applications including medicine (medical grade active carbon), light and heat absorption, electromagnetic shielding, organic light emission, solar energy reception, catalysts, sensors, carbon electrodes in lithium batteries, thermally conductive nanoscale composite materials with special electrical properties, and nanoscale carbon powder for printing.

SUMMARY OF THE INVENTION

Accordingly, an object of the present invention is to prepare polymer-chain-grafted carbon nanocapsules, thereby expanding the application of carbon nanocapsules.

Therefore, the invention provides a polymer-chain-grafted carbon nanocapsule. The polymer-chain-grafted carbon nanocapsule includes a carbon nanocapsule and at least one kind of polymer chain grafted thereon, forming a polymer-chain-grafted carbon nanocapsule in which the carbon nanocapsule is the core thereof. The polymer-chain-grafted carbon nanocapsules have the following formula: F(-P)m, in which F is the carbon nanocapsule, P is the polymer chain, and m is the number of the polymer chain.

According to the invention, the polymer chain of the polymer-chain-grafted carbon nanocapsule can further comprise at least a functional group, and the polymer-chain-grafted carbon nanocapsule thus has the following formula: F(-E)n(-P)m, in which F is the carbon nanocapsule, P is the polymer chain, E is the functional group, m is the number of the polymer chain, and n is the number of the functional group.

According to the invention, the polymer chain can be thermal plastic polymer, conductive polymer, liquid crystal polymer, resin polymer or bio-polymer.

According to the invention, the carbon nanocapsule is a polyhedral carbon cluster constituting multiple graphite layers having a balls-within-a ball structure, and the diameter of a carbon nanocapsule is 3–100 nm.

According to the invention, the carbon nanocapsule is a hollow carbon nanocapsule or a metal-filled carbon nanocapsule filled with metals, metal oxides, metal carbides, or alloys.

DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
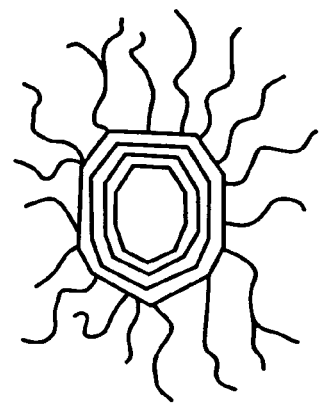
FIG. 1 illustrates polymer-chain-grafted carbon nanocapsules.

FIG. 1 illustrates polymer-chain-grafted carbon nanocapsules, in which a polymer-chain-grafted carbon nanocapsule with metals, metal oxides, metal carbides, or alloys filled therein is represented on the left, while a polymer-chain-grafted hollow carbon nanocapsule is represented on the right. As shown in FIG. 1, the polymer-chain-grafted carbon nanocapsule provided in the present invention includes a carbon nanocapsule and at least one kind of polymer chain grafted thereon, forming a polymer-chain-grafted carbon nanocapsule in which the carbon nanocapsule is the core thereof.

Before preparing organically-functionalized carbon nanocapsules, high-purity carbon nanocapsules must first be prepared, by the preparation method described, for example, in the above-mentioned references. The carbon nanocapsule obtained is a polyhedral carbon cluster constituting multiple graphite layers having a balls-within-a ball structure, wherein the diameter of a carbon nanocapsule is 3–100 nm. The carbon nanocapsules for preparation of organically-functionalized carbon nanocapsules can be hollow or filled with metals, metal oxides, metal carbides, or alloys.

The methods of preparing polymer-chain-grafted carbon nanocapsules applied in the invention are analogous to those of carbon 60. However, owing to the relatively greater size of carbon nanocapsules, the nano-dispersing technique is important for the control of chemical modifying effects. In addition, carbon nanocapsules have different optical, electrical, and magnetic properties from carbon nanotubes and carbon 60, thus the polymer-chain-grafted carbon nanocapsules have distinct applications.

By grafting polymer chains onto carbon nanocapsules, the carbon nanocapsules are easily dissolved (or dispersed) in the solvent, expanding the application thereof and bringing out new electro-optical properties, and can be further prepared as a composite material.

The carbon nanocapsules can be polymer-chain-grafted by a functionalization reaction, cycloaddition reaction, or a radical addition reaction.

In the functionalization reaction, the purified carbon nanocapsule is first functionalized by functional groups, and then reacted with polymer or monomer via the reactive functional groups, forming a polymer-chain-grafted carbon nanocapsule with polymer chains grafted thereon by the functional groups. In the polymer-chain-grafted carbon nanocapsule, the carbon nanocapsule is the core of the molecule, and all of the polymer chains are grafted on the carbon nanocapsule, without crosslinking therebetween. The functional groups applicable are, for example, —OH, —C=O, —CHO or —COOH.

According to the functionalization reaction, the carbon nanocapsule can be organically functionalized to form a molecule represented as F(-E)n, whereby an end or a side chain of the polymer chain is then grafted onto the carbon nanocapsule via the addition reaction between the functional group and the polymer chain, forming a polymer-chain-grafted carbon nanocapsule with a formula of F(-E)n(-P)m, in which m<n.

According to the functionalization reaction, the carbon nanocapsule can be organically functionalized to form a molecule represented as F(-E)n, and the functionalized carbon nanocapsule is then copolymerized with the monomer of the polymer chain via the functional group to form a polymer-chain-grafted carbon nanocapsule with a formula of F(-E)n(-P)m, in which m<n.

In the cycloaddition reaction, the carbon nanocapsule is reacted with polymer or monomer via the double bonds on the surface thereof to graft polymer chains thereon.

In the radical addition reaction, a free-radical initiator, for example, $K_2S_2O_8$, $H_2O_2$, or azobis-isobutyronitrile (AIBN) is applied to induce breakage of the double bonds on the surface of the carbon nanocapsule, and thereby polymers or monomers are grafted thereon.

According to the invention, the polymer chain maybe grafted onto the carbon nanocapsule via a radical reaction or double-bond addition reaction between an end or a side chain of the polymer chain and a double bond on the surface of the carbon nanocapsule.

According to the invention, the carbon nanocapsule maybe copolymerized with the monomer of the polymer chain via a radical reaction or double-bond addition reaction, such that an end of the polymer chain is linked to a double bond on the surface of the carbon nanocapsule.

In addition, U.S. Pat. No. 5,635,581 and U.S. Pat. No. 5,292,813 incorporated herein by reference describe other preparation methods of polymer-chain-grafted carbon nanocapsules.

Accordingly to the invention, a polymer-chain-grafted carbon nanocapsule is further provided, which includes a carbon nanocapsule and at least one kind of polymer chain grafted thereon, forming a polymer-chain-grafted carbon nanocapsule in which the carbon nanocapsule is the core thereof. The polymer-chain-grafted carbon nanocapsules have the following formula: F(-P)m, in which F is the carbon nanocapsule, P is the polymer chain, and m is the number of the polymer chain, preferably ranging from 1–100,000.

According to the invention, the polymer chain of the polymer-chain-grafted carbon nanocapsule can further comprise at least a functional group, and the polymer-chain-grafted carbon nanocapsule thus has the following formula: F(-E)n(-P)m, in which F is the carbon nanocapsule, P is the polymer chain, E is the functional group, m is the number of the polymer chain, and n is the number of the functional group, preferably ranging from 1–100,000.

The polymer chain can be an organic polymer chain having a molecular weight of 500–1,000,000. The polymer chain is, for example, thermal plastic polymer, conductive polymer, liquid crystal polymer, resin polymer or bio-polymer.

The thermal plastic polymer is, for example, PVdc, PVd, PVAc, PS, ABS, PE, EVA, PP, TPX, PMMA, CA, PTFE, PCTFE, PA, POM, PC, PU, PETP, Kevlar or the copolymer thereof.

The conductive polymer is, for example, polyaniline (PAN), polypyrrole (PPy), polythiophenes, polyacetylene (PAc), poly(para-phenylene), poly(para-phenylene-vinylene) (PPv), or the copolymer thereof.

The molecular configuration of the liquid crystal polymer can be asymmetric, being rod-like or disk-like. The liquid crystal polymer is, for example, organic salt, aliphatic carboxylic acid or its derivative, aromatic carboxylic acid or its derivative, derivative of ether, derivative of ketone, polycyclic hydrocarbon or its derivative, azomethine compound, derivative of $C_5H_5N$ or glyoxal, azo compound, bisazomethine compound, azomethin-azo compound, azoxy compound, azomethin-azoxy compound, disulphide, derivative of sterol or derivative of steroid.

The resin polymer is, for example, uncrosslinked linear molecule of NR, IR, SBR, BR, IIR, EPDM, NBR, CR, ACM, CO, ECO, FKM, PU, CSM, sulfur (T) or the copolymer thereof.

The bio-polymer is, for example, a DNA fragment, RNA fragment, lipid, protein molecule or a linear molecule having peptide or phosphopeptide linkage.

The functional group is, for example, —COOH, —(C=O)—NH—, —(C=O)—NR—, —(C=O)Cl, —(C=O)—OR—, —OH, —OR, —O—(C=O)—NH—, —(C=O)—OR—, —NH—(C=S)—O—, —NH, —RSH, —SH, —NHOH, —SO$_3$H, —OSO$_3$H, —CONH$_2$, —CO—NH—NH$_2$, —CH(NH$_2$)—COOH, —P(OH)$_3$, —PO(OH)$_2$, —O—PO(OH)$_2$, —O—PO(OH)—O—PO(OH)$_2$, —O—PO(O)—O—CH$_2$CH$_2$NH$_3^+$, -glycoside, —O—CH$_2$—(CHOH)$_4$, —CH$_2$OH, —O—CH—OSO$_3^-$ or —X, wherein X is F, Cl, Br or I, and R is hydrocarbon.

The inventive polymer-chain-grafted carbon nanocapsule has potential for developing functional carbon nanocapsule composites. Different from conventional polymer composites which involve only blending of carbon nanocapsules into polymers, but lack stable chemical bonding between the carbon nanocapsule and polymers, the inventive polymer-chain-grafted carbon nanocapsule offers stable chemical bonding between the polymer chain and the carbon nanocapsule, wherein the carbon nanocapsule can be the crosslinking center of the polymer composite, improving electro-, heat-conduction, and structural strength.

EXAMPLE 1

Kevlar Fiber

Figure 2:
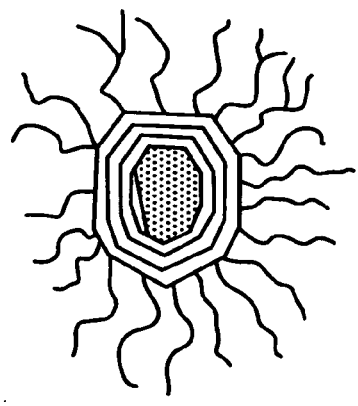
FIG. 2 illustrates the synthesis of a polymer-chain-grafted carbon nanocapsule involving functionalization of a carbon nanocapsule.
Figure 2:
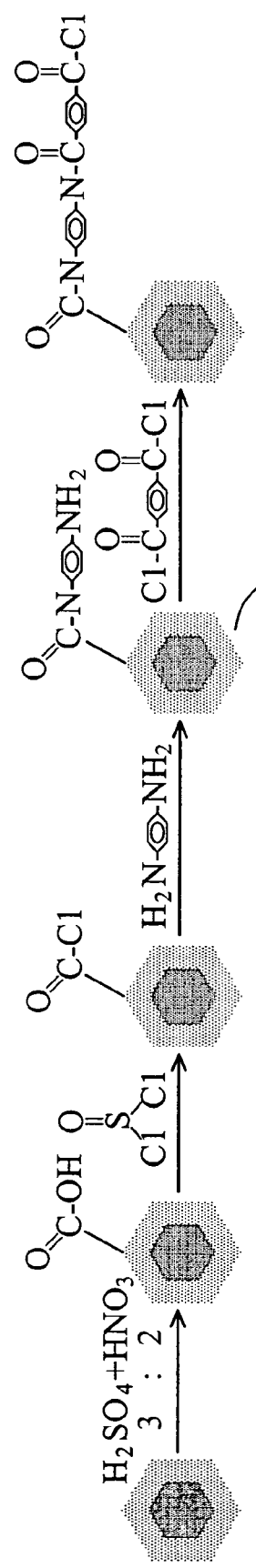

FIG. 2 illustrates the synthesis of a polymer-chain-grafted carbon nanocapsule involving functionalization of a carbon nanocapsule.

A reaction flask (1 L) was charged with carbon nanocapsules (1.0 g) dissolved in sulfuric acid/nitric acid (weight ratio=1:1). The mixture was stirred by an ultrasonic cleaner for 10 mins, and then heated to about 140° C. and refluxed for 2 hours. Afterwards, the mixture was centrifuged to separate the carbon nanocapsules from the strong acid, rinsing the carbon nanocapsules thoroughly followed by several centrifuges, until the pH value of carbon nanocapsules approached 7. The carbon nanocapsules obtained were black with —COOH groups bonded thereon. By titration using NaOH, the concentration of the —COOH groups was identified as 13 μmols/per gram carbon nanocapsules. The oxidization of carbon nanocapsules resulted in damage of the surface carbon layers, which could be observed under a transmission electron microscope. The organically-functionalized carbon nanocapsules were soluble in water by virtue of the —COOH groups.

A reaction flask (1 L) was then charged with the organically-functionalized carbon nanocapsules (1.0 g) dissolved in $SOCl_2$ (500 ml). The mixture was stirred by an ultrasonic cleaner for 10 mins, and then heated and refluxed for 2 hours. Afterwards, the mixture was distilled to remove the solvent from the carbon nanocapsules, leaving black carbon nanocapsules with —COOCl groups bonded thereon. Chloroform (250 ml) was then added to the reaction flask with the functionalized carbon nanocapsules, and aniline/chloroform (1M) was gradually dropped into the mixture, forming dark indigo precipitation, soluble in water or alcohol, as the product C shown in FIG. 2. Afterwards, terephthalyl chloride/chloroform (250 ml, 1M) was gradually added in the mixture, and green particles of Kevlar fiber were precipitated (soluble only in hot concentrated sulfuric acid).

EXAMPLE 2

Polyaniline-Grafted Carbon Nanocapsule

A reaction flask (1 L) was charged with $(NH_4)_2S_2O_4/HCl$ (1 M, 100 ml) and cooled at 0° C. 1.0 g of carbon nanocapsules and purified aniline (10 ml) were then added in the flask, stirred by an ultrasonic cleaner for 10 mins. The mixture was continuously stirred until polyaniline was bonded on the surface of the carbon nanocapsules. The polyaniline (PAN) molecular chains not bonded on the carbon nanocapsules were then washed away by a solvent; The PAN-grafted carbon nanocapsules were characterized by TGA to quantify the weight ratio of PAN to carbon nanocapsules, which was 40:60. The PAN-grafted carbon nanocapsules were then characterized by IR spectrometer, showing peaks at 3417 $cm^{-1}$, 1577 $cm^{-1}$, 1492 $cm^{-1}$, 1297 $cm^{-1}$, 1136 $cm^{-1}$, and 813 $cm^{-1}$, wherein 1577 $cm^{-1}$ and 813 $cm^{-1}$ indicate the signal resulted from the bonding between PAN and the carbon nanocapsules. The PAN-grafted carbon nanocapsules were also characterized by photoluminescence spectroscopy, excited by a light of 300 nm, showing a new photoluminescence signal at 419 nm.

EXAMPLE 3

Polymethyl Methacrylate-Grafted Carbon Nanocapsule

Example 3a

A reaction flask (1 L) was charged with carbon nanocapsules (100 mg), cetyl trimethyl ammonium bromide ($C_{16}TMAB$, 20 g), purified methylmethacrylate (MMA, 25 g) and $K_2S_2O_8$ (120 mg) dissolved in water (500 ml). The solution mixture was purged with $N_2$ prior to stirring and heating to 70° C. for 5 hours. The mixture was dried and dissolved into methanol, and then filtered to wash $C_{16}TMAB$ away. The step was repeated at least three times to make sure $C_{16}TMAB$ was completely removed. The product was black carbon nanocapsules. The product was then dissolved in chloroform (500 ml) and filtered to remove the PMMA molecular chains not bonded thereon. The step was repeated at least three times to make sure the unbonded PMMA were washed away. The product was easily soluble organic solvent such as chloroform and toluene.

The PMMA-grafted carbon nanocapsules were then characterized by IR spectrometer, showing a new peak at 1581 $cm^{-1}$, indicating a bonding between PMMA and the carbon nanocapsule is formed.

Example 3b

A reaction flask (1 L) was charged with carbon nanocapsules (100 mg), purified methylmethacrylate (25 g), and azobis-isobutyronitrile (AIBN, 2 wt %) dissolved in toluene (500 ml). The mixture was stirred by an ultrasonic cleaner for 10 mins, and then heated to 70° C. and refluxed for 6 hours, whereby AIBN was degraded to form a free radical of —$C(CH_3)_2CN$, initiating the radial polymerization between MMA and the surface double bonds of the carbon nanocapsules, forming PMMA-grafted carbon nanocapsules.

The product was then dissolved in chloroform (500 ml) and filtered to remove the PMMA molecular chains not bonded thereon. The step was repeated at least three times to ensure that the unbonded PMMA were washed away. The product was easily soluble organic solvent such as chloroform and toluene.

The foregoing description has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A polymer-chain-grafted carbon nanocapsule, comprising:
   a carbon nanocapsule; and
   at least one kind of polymer chain grafted thereon, forming a polymer-chain-grafted carbon nanocapsule in which the carbon nanocapsule is the core thereof,
   wherein the polymer-chain-grafted carbon nanocapsule is of the following formula:
   F(-P)m, in which F is the carbon nanocapsule, P is the polymer chain, and m is the number of the polymer chain.

2. The polymer-chain-grafted carbon nanocapsule as claimed in claim 1, wherein the polymer chain further comprises at least a functional group and the polymer-chain-grafted carbon nanocapsule is of the following formula: F(-E)n(-P)m, in which F is the carbon nanocapsule, P is the polymer chain, E is the functional group, m is the number of the polymer chain, and n is the number of the functional group.

3. The polymer-chain-grafted carbon nanocapsule as claimed in claim 1, wherein the carbon nanocapsule is hollow.

4. The polymer-chain-grafted carbon nanocapsule as claimed in claim 1, wherein the carbon nanocapsule is a metal-filled carbon nanocapsule filled with metals, metal oxides, metal carbides, or alloys.

5. The polymer-chain-grafted carbon nanocapsule as claimed in claim 1, wherein m is 1–100,000.

6. The polymer-chain-grafted carbon nanocapsule as claimed in claim 2, wherein n is 1–100,000.

7. The polymer-chain-grafted carbon nanocapsule as claimed in claim 2, wherein the functional group is —COOH, —(C=O)—NH—, —(C=O)—NR—, —(C=O)Cl, —(C=O)—OR—, —OH, —OR, —O—(C=O)—NH—, —(C=O)—OR—, —NH—(C=S)—O—, —NH, —RSH, —SH, —NHOH, —$SO_3H$, —$OSO_3H$, —CONH$_2$, —CO—NH—NH$_2$, —CH(NH$_2$)—COOH, —P(OH)$_3$, —PO(OH)$_2$, —O—PO(OH)$_2$, —O—PO(OH)—O—PO(OH)$_2$, —O—PO(O)—O—CH$_2$CH$_2$NH$_3^+$, -glycoside, —O—CH$_2$—(CHOH)$_4$, —CH$_2$OH, —O—CH—OSO$_3^-$ or —X, wherein X is F, Cl, Br or I, and R is hydrocarbon.

8. The polymer-chain-grafted carbon nanocapsule as claimed in claim 1, wherein the polymer chain is grafted onto the carbon nanocapsule via a radical reaction or double-bond addition reaction between an end or a side chain of the polymer chain and a double bond on the surface of the carbon nanocapsule.

9. The polymer-chain-grafted carbon nanocapsule as claimed in claim 1, wherein the carbon nanocapsule is copolymerized with the monomer of the polymer chain via a radical reaction or double-bond addition reaction, such that an end of the polymer chain is linked to a double bond on the surface of the carbon nanocapsule.

10. The polymer-chain-grafted carbon nanocapsule as claimed in claim 2, wherein the carbon nanocapsule is organically functionalized to form a molecule represented as F(-E)n, whereby an end or a side chain of the polymer chain is then grafted onto the carbon nanocapsule via the addition reaction between the functional group and the polymer chain, forming a polymer-chain-grafted carbon nanocapsule with a formula of F(-E)n(-P)m, in which m<n.

11. The polymer-chain-grafted carbon nanocapsule as claimed in claim 2, wherein the carbon nanocapsule is organically functionalized to form a molecule represented as F(-E)n, and the functionalized carbon nanocapsule is then copolymerized with the monomer of the polymer chain via the functional group to form a polymer-chain-grafted carbon nanocapsule with a formula of F(-E)n(-P)m, in which m<n.

* * * * *